(12) United States Patent
Tiprigan et al.

(10) Patent No.: US 11,708,156 B2
(45) Date of Patent: Jul. 25, 2023

(54) FRICTION WELDED RACEWAYS FOR USE IN ROTORCRAFT PROPULSION ASSEMBLIES

(71) Applicant: Textron Innovations Inc., Providence, RI (US)

(72) Inventors: Ezra Mike Tiprigan, North Richland Hills, TX (US); Charles Hubert Speller, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 105 days.

(21) Appl. No.: 17/506,058

(22) Filed: Oct. 20, 2021

(65) Prior Publication Data
US 2023/0122735 A1    Apr. 20, 2023

(51) Int. Cl.
*B64C 27/14* (2006.01)
*B64F 5/10* (2017.01)
*B64C 27/06* (2006.01)
*B64C 29/00* (2006.01)

(52) U.S. Cl.
CPC ............. *B64C 27/14* (2013.01); *B64C 27/06* (2013.01); *B64C 29/0033* (2013.01); *B64F 5/10* (2017.01)

(58) Field of Classification Search
CPC .................................................... B64C 27/14
See application file for complete search history.

(56) References Cited

U.S. PATENT DOCUMENTS

| | | | |
|---|---|---|---|
| 3,550,232 A * | 12/1970 | Burnett | F16C 11/0614 |
| | | | 29/898.044 |
| 3,631,585 A * | 1/1972 | Stamm | F16C 3/02 |
| | | | 228/114.5 |
| 4,580,945 A | 4/1986 | Miller | |
| 5,118,256 A * | 6/1992 | Violette | F16C 27/066 |
| | | | 416/239 |
| 6,062,762 A * | 5/2000 | Lustig | B60G 7/00 |
| | | | 228/171 |
| 7,938,628 B2 | 5/2011 | Lin | |
| 10,017,247 B1 | 7/2018 | Elliott et al. | |
| 10,960,972 B2 | 3/2021 | Mueller et al. | |
| 2005/0247756 A1 * | 11/2005 | Frazer | B29C 65/58 |
| | | | 228/101 |

(Continued)

FOREIGN PATENT DOCUMENTS

JP     2013504727 A  *  2/2013

OTHER PUBLICATIONS

Manufacturing Technology Inc (MTI), "Inertia Friction Welder for Marine e Drive Shafts—Model 180B", Aug. 12, 2016, https://www.youtube.com/watch?v=2SwzojBHLIM (Year: 2016).*

*Primary Examiner* — Tien Q Dinh
*Assistant Examiner* — William L Gmoser
(74) *Attorney, Agent, or Firm* — Lawrence Youst PLLC

(57) ABSTRACT

A propulsion assembly for a rotorcraft includes a raceway having a tapered inner surface and a mast configured to receive the raceway at a raceway receiving station. The mast has a tapered outer surface at the raceway receiving station. The propulsion assembly includes a mast bearing assembly having a plurality of bearings facing the mast to engage the raceway. The tapered inner surface of the raceway is friction welded to the tapered outer surface of the mast at the raceway receiving station to form a tapered friction weld line.

20 Claims, 11 Drawing Sheets

(56) References Cited

U.S. PATENT DOCUMENTS

| | | | |
|---|---|---|---|
| 2014/0016888 A1* | 1/2014 | Harper | F16C 33/74 384/147 |
| 2018/0163795 A1* | 6/2018 | Olson | F16H 57/0025 |
| 2019/0092484 A1* | 3/2019 | Whiteford | B64D 27/26 |
| 2020/0031463 A1 | 1/2020 | Mueller et al. | |
| 2020/0102072 A1* | 4/2020 | Mueller | B64F 5/10 |

* cited by examiner

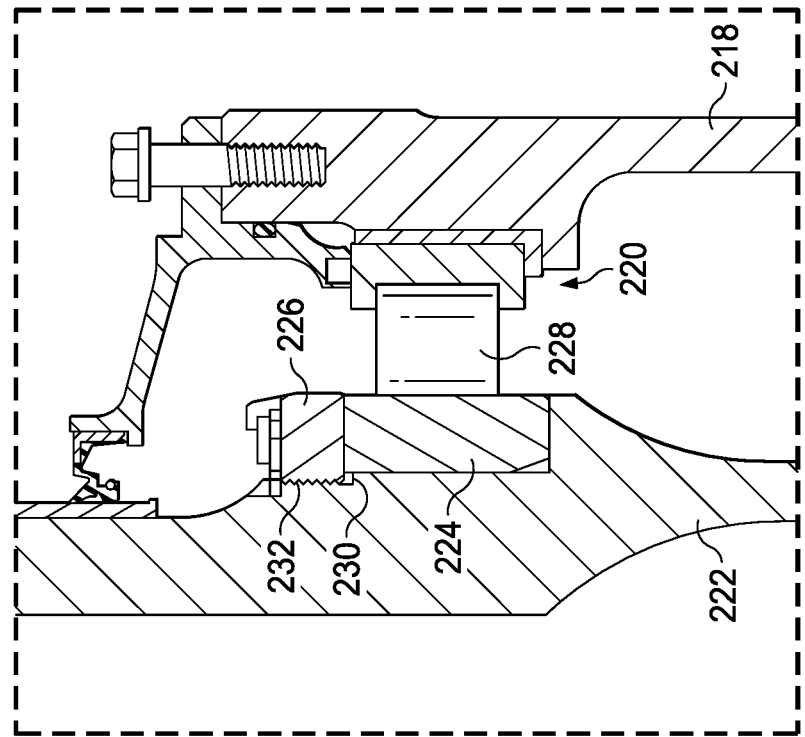
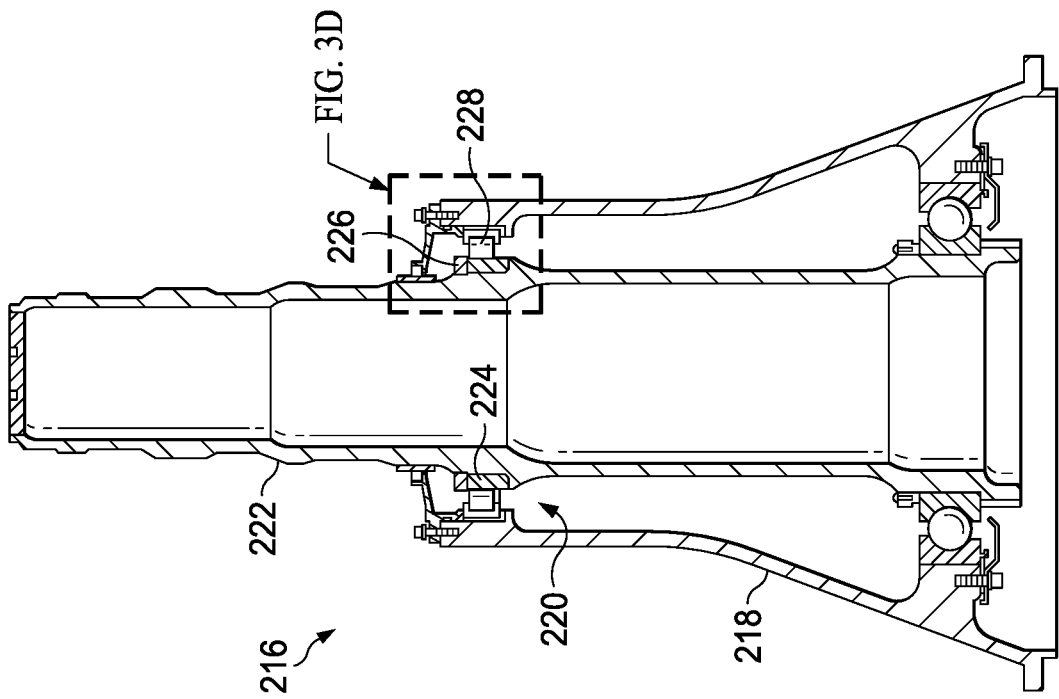
FIG. 3D (PRIOR ART)
FIG. 3C (PRIOR ART)

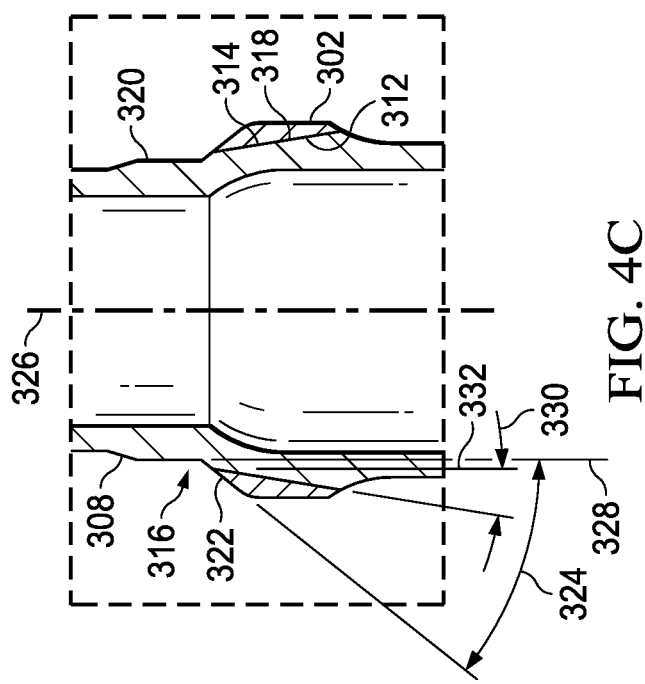
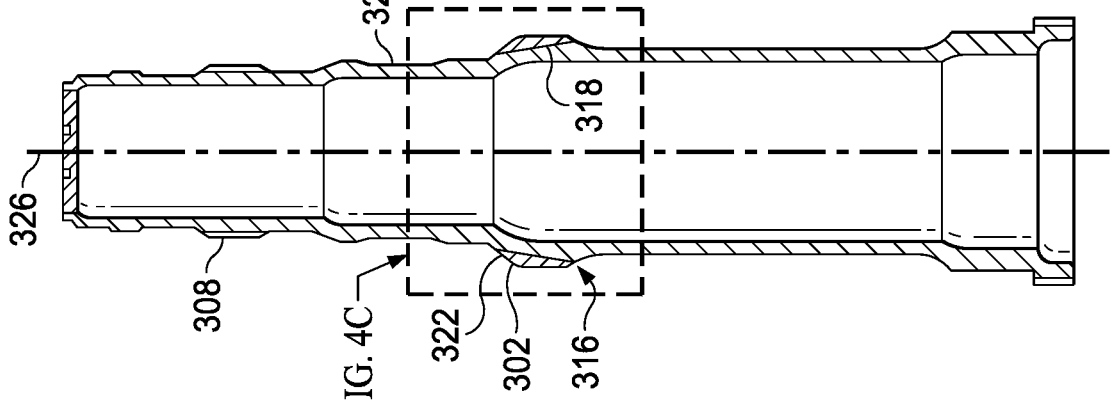
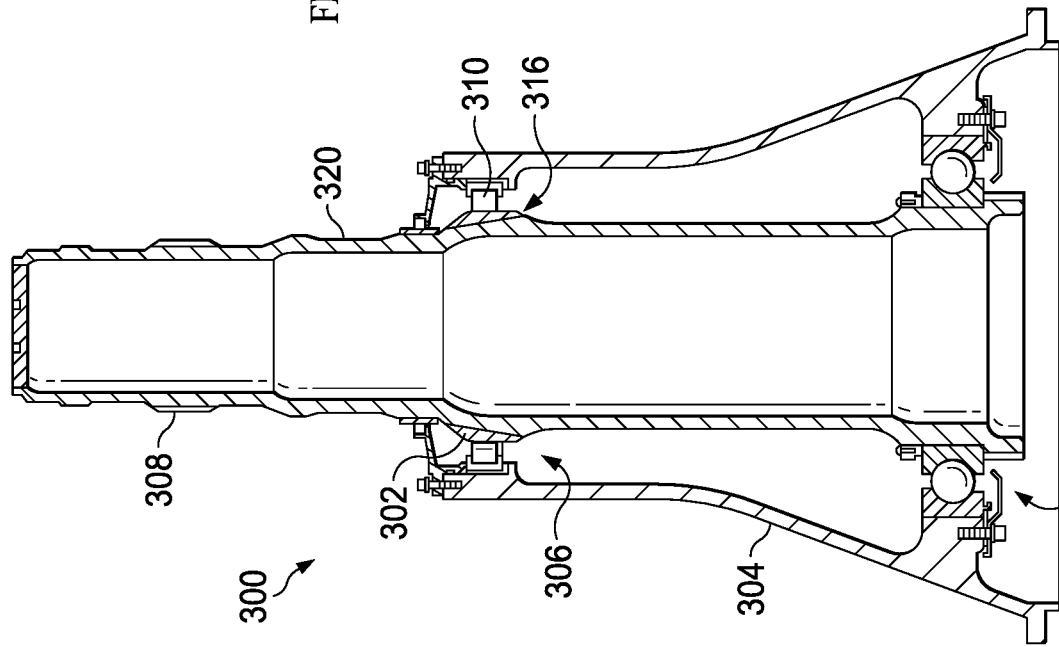
FIG. 4C
FIG. 4B
FIG. 4A

FRICTION WELDED RACEWAYS FOR USE IN ROTORCRAFT PROPULSION ASSEMBLIES

TECHNICAL FIELD OF THE DISCLOSURE

The present disclosure relates, in general, to raceways for use in rotorcraft propulsion assemblies and, in particular, to propulsion assemblies including a mast and a raceway friction welded to one another to form an integral or fused mast-raceway structure.

BACKGROUND

Rotorcraft propulsion assemblies include a drive system that transfers rotational energy from a power source such as an engine to a rotor. Rotorcraft drive systems include a mast, which typically extends from a transmission and terminates at a rotor hub from which a number of rotor blades radially extend. Because masts carry shear, thrust and other loads during operation, propulsion assemblies often utilize a mast bearing assembly including bearings that engage with the mast to facilitate mast rotation while providing structural support for the mast against these loads. Raceways on the outer surface of the mast provide a surface against which the bearings of the mast bearing assembly engage. Because raceways are required to bear shear, thrust and other loads transmitted via the bearings, raceways are often harder than the remainder of the mast.

Propulsion assemblies that include integral raceways require that the mast be made from conventional steel that can be induction hardened or carburized to form a case hardened surface to act as a raceway for the bearings. Such conventional steel, however, tends to corrode in areas such as the hub spline and as a result may require more frequent replacement. While corrosion issues may be mitigated by forming the mast using stainless steel, integral raceways require a case hardened surface that cannot be sufficiently achieved with stainless steel. Another current solution is to weld a lower mast formed from conventional steel and including an integral raceway to an upper mast formed from stainless steel, although the mast assembly formed thereby disadvantageously includes a circumferential weld line though which the torque path must travel, resulting in reduced structural integrity. Integral raceways also require the entire mast to be replaced if the raceway is damaged.

Nonintegral raceways may be used to overcome these drawbacks. Propulsion assemblies utilizing a nonintegral raceway may include a mast formed from corrosion resistant steel such as stainless steel and a raceway formed from conventional steel capable of being hardened. Current propulsion assemblies with nonintegral raceways have, however, encountered numerous other challenges. For example, in fastening the raceway to the mast, current nonintegral raceways require mast threads, nuts and other fasteners that cause structurally compromising stress concentrations, especially when experiencing induced cyclic loading during flight. Current nonintegral raceways also require more parts, thereby increasing the weight of the propulsion assembly and introducing additional stress points during operation. Furthermore, nonintegral raceways are susceptible to undesireable movement when subjected to loads during flight. Accordingly, a need has arisen for propulsion assemblies incorporating masts and raceways that overcome these and other drawbacks of current propulsion assemblies.

SUMMARY

In a first aspect, the present disclosure is directed to a propulsion assembly for a rotorcraft including a raceway having a tapered inner surface and a mast configured to receive the raceway at a raceway receiving station. The mast has a tapered outer surface at the raceway receiving station. The propulsion assembly includes a mast bearing assembly having a plurality of bearings facing the mast to engage the raceway. The tapered inner surface of the raceway is friction welded to the tapered outer surface of the mast at the raceway receiving station to form a tapered friction weld line.

In some embodiments, the raceway may be formed from M50 alloy steel, 4340 alloy steel and/or carburized steel. In certain embodiments, the raceway may be formed from a different material than the mast. In some embodiments, the raceway may be a machined raceway shaped to engage the bearings. In certain embodiments, the mast may be a corrosion resistant steel (CRES) mast. In some embodiments, the raceway and/or the mast may form a lead-in chamfer adjacent to an edge of the raceway. In certain embodiments, the raceway may be friction welded to the mast to form an integral mast-raceway structure. In some embodiments, the tapered friction weld line may form an acute taper angle such as an acute taper angle in a range between 25 degrees and 45 degrees.

In a second aspect, the present disclosure is directed to a rotorcraft including a fuselage and a propulsion assembly coupled to the fuselage. The propulsion assembly includes a raceway having a tapered inner surface and a mast configured to receive the raceway at a raceway receiving station. The mast has a tapered outer surface at the raceway receiving station. The propulsion assembly includes a mast bearing assembly including a plurality of bearings facing the mast to engage the raceway. The tapered inner surface of the raceway is friction welded to the tapered outer surface of the mast at the raceway receiving station to form a tapered friction weld line.

In some embodiments, the propulsion assembly may include a top case housing the mast bearing assembly. In certain embodiments, the rotorcraft may be a helicopter and the propulsion assembly may be a main rotor assembly. In some embodiments, the rotorcraft may be a tiltrotor aircraft including a wing supported by the fuselage and including first and second outboard ends. In such embodiments, the propulsion assembly may include first and second propulsion assemblies each coupled to a respective outboard end of the wing, the mast of each propulsion assembly rotatable relative to the fuselage between a plurality of positions including a substantially horizontal orientation in a forward flight mode and a substantially vertical orientation in a vertical takeoff and landing flight mode.

In a third aspect, the present disclosure is directed to a method for assembling an integral mast-raceway structure for a rotorcraft including providing a mast having a raceway receiving station with a tapered outer surface; providing a raceway having a tapered inner surface; positioning the raceway relative to the mast until the raceway is proximate the raceway receiving station of the mast; rotating the mast and/or the raceway about a longitudinal axis of the mast; pressing the mast and the raceway against one another during the rotating step; and forming a tapered friction weld line between the raceway to the mast, thereby fusing the raceway to the mast.

In some embodiments, rotating the mast and/or the raceway may include rotating the raceway about the longitudinal axis of the mast and pressing the mast and the raceway against one another may include pressing the mast against the rotating raceway. In certain embodiments, the method may include machining the raceway to form a bearing engagement surface. In some embodiments, the method may include machining the mast and/or the raceway to remove material extruded from the weld line. In certain embodiments, the method may include machining the mast and/or the raceway to form a lead-in chamfer.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3F are cross-sectional views of propulsion assemblies utilizing integral, fastener-mounted and press fit raceways;

FIGS. 4A-4C are cross-sectional views of a propulsion assembly utilizing a friction welded raceway in accordance with embodiments of the present disclosure;

DETAILED DESCRIPTION

Figure 1A:
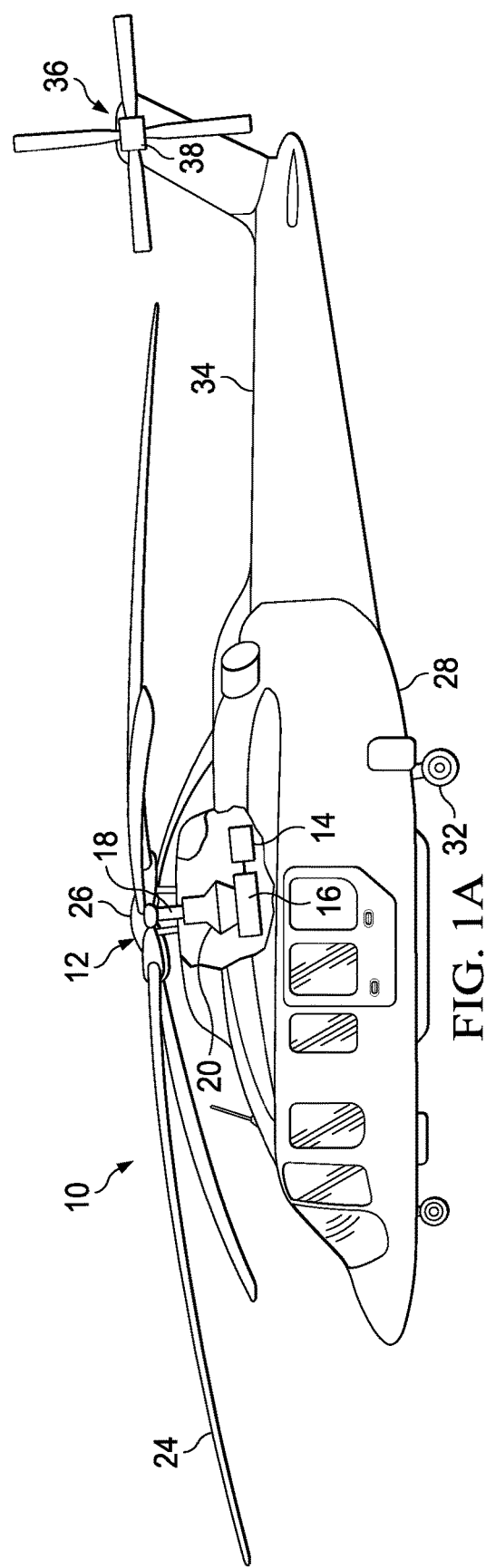
FIGS. 1A-1D are schematic illustrations of a helicopter having a main rotor assembly utilizing a friction welded raceway in accordance with embodiments of the present disclosure.
Figure 1B:
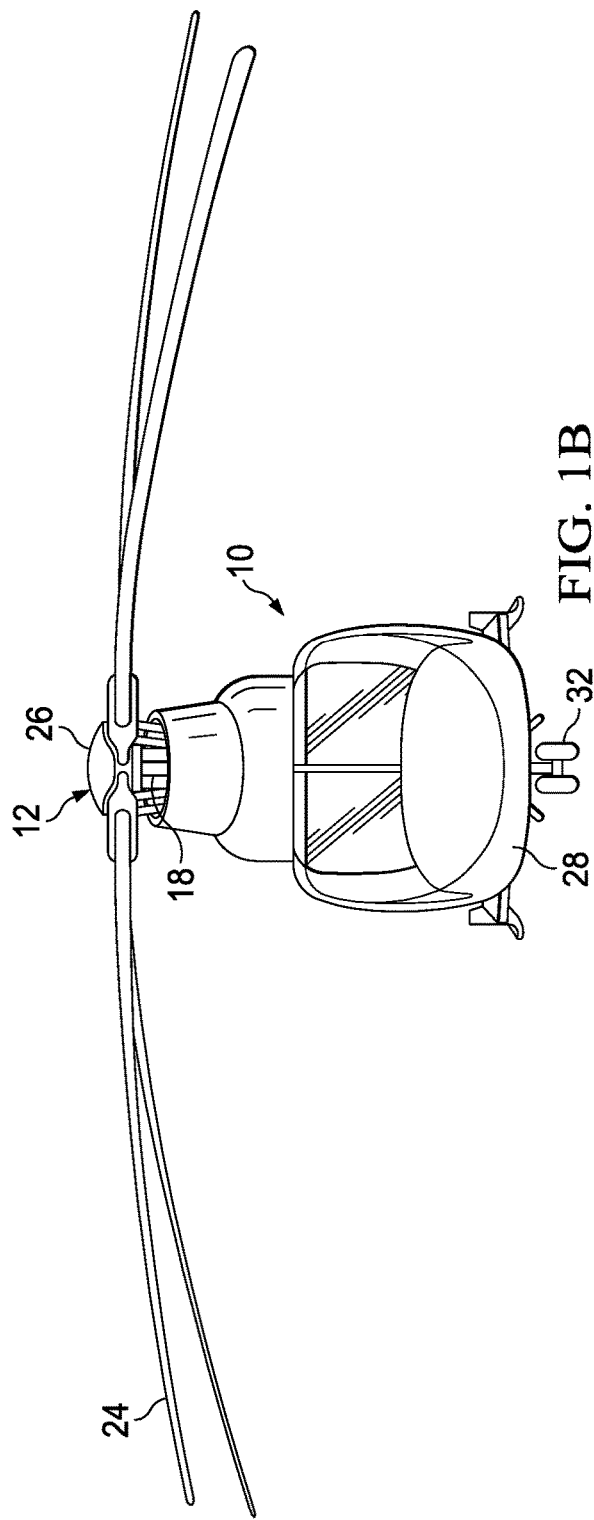
Figure 1C:
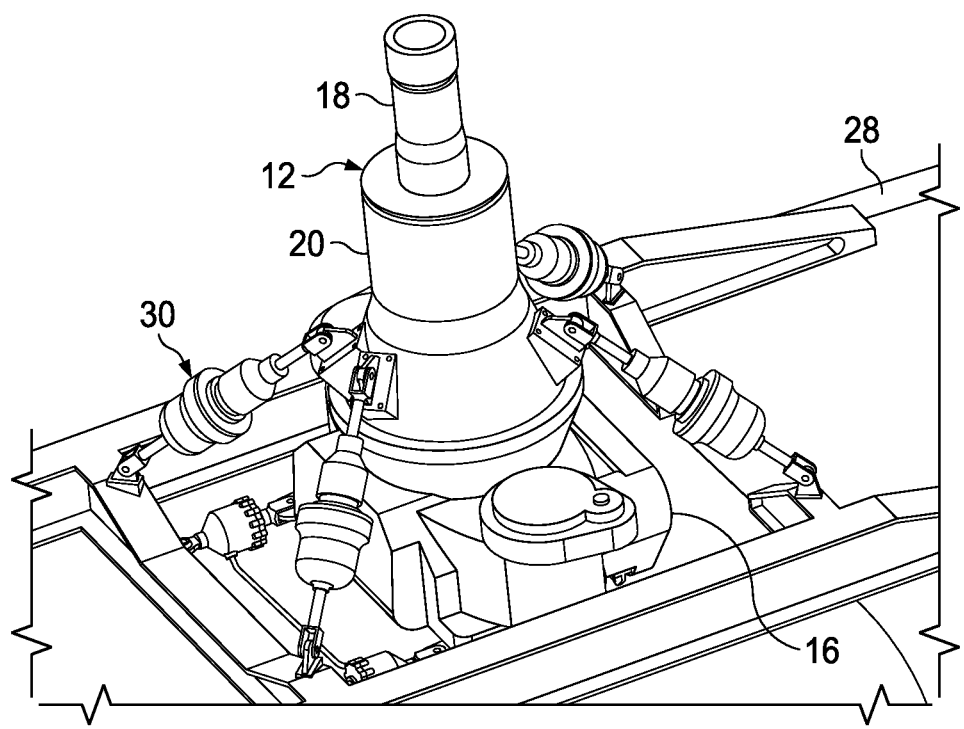
Figure 1D:
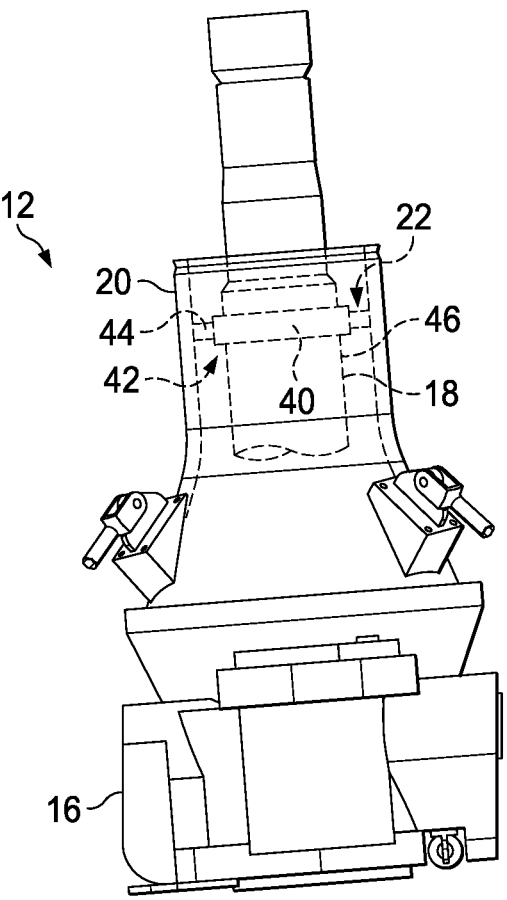

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1D in the drawings, a helicopter is schematically illustrated and generally designated 10. The primary propulsion assembly of helicopter 10 is a main rotor assembly 12 powered by an engine 14 via a main rotor gearbox 16. Mast 18 extends through a top case 20, which houses a mast bearing assembly 22 to facilitate the stable rotation of mast 18. Main rotor assembly 12 includes a plurality of rotor blade assemblies 24 extending radially outward from a main rotor hub 26. Main rotor assembly 12 is coupled to a fuselage 28. A vibration isolation system 30 may be utilized to isolate the vibration of main rotor assembly 12 from fuselage 28 and the components and passengers therein. Main rotor hub 26 is rotatable relative to fuselage 28. The pitch of rotor blade assemblies 24 can be collectively and/or cyclically manipulated to selectively control direction, thrust and lift of helicopter 10. A landing gear system 32 provides ground support for helicopter 10. A tailboom 34 extends from fuselage 28 in the aft direction. An anti-torque system 36 includes a tail rotor 38 that is rotatably coupled to the aft portion of tailboom 34. Anti-torque system 36 controls the yaw of helicopter 10.

Main rotor assembly 12 includes an annular raceway 40, which surrounds mast 18 at a raceway receiving station 42 of mast 18. Roller bearings 44 of mast bearing assembly 22, which may carry reactions in the shear direction, circumferentially face mast 18 to engage raceway 40. In some embodiments, raceway 40 is formed from a different material, such as a different type of steel, than mast 18 so that raceway 40 can be hardened using any hardening technique while mast 18 may be formed from a material that is not as easily hardened but exhibits suitable corrosion resistance properties. Raceway 40 provides a smooth and hard surface on which roller bearings 44 may roll. Raceway 40 is friction welded to mast 18 at raceway receiving station 42, thereby forming an integral mast-raceway structure 46 in which raceway 40 is fused to mast 18. The friction weld between raceway 40 and mast 18 prevents raceway 40 from rotating around mast 18 or moving axially along mast 18. In other embodiments, tail rotor 38 may also utilize a friction welded raceway to engage with bearings therein.

Figure 2A:
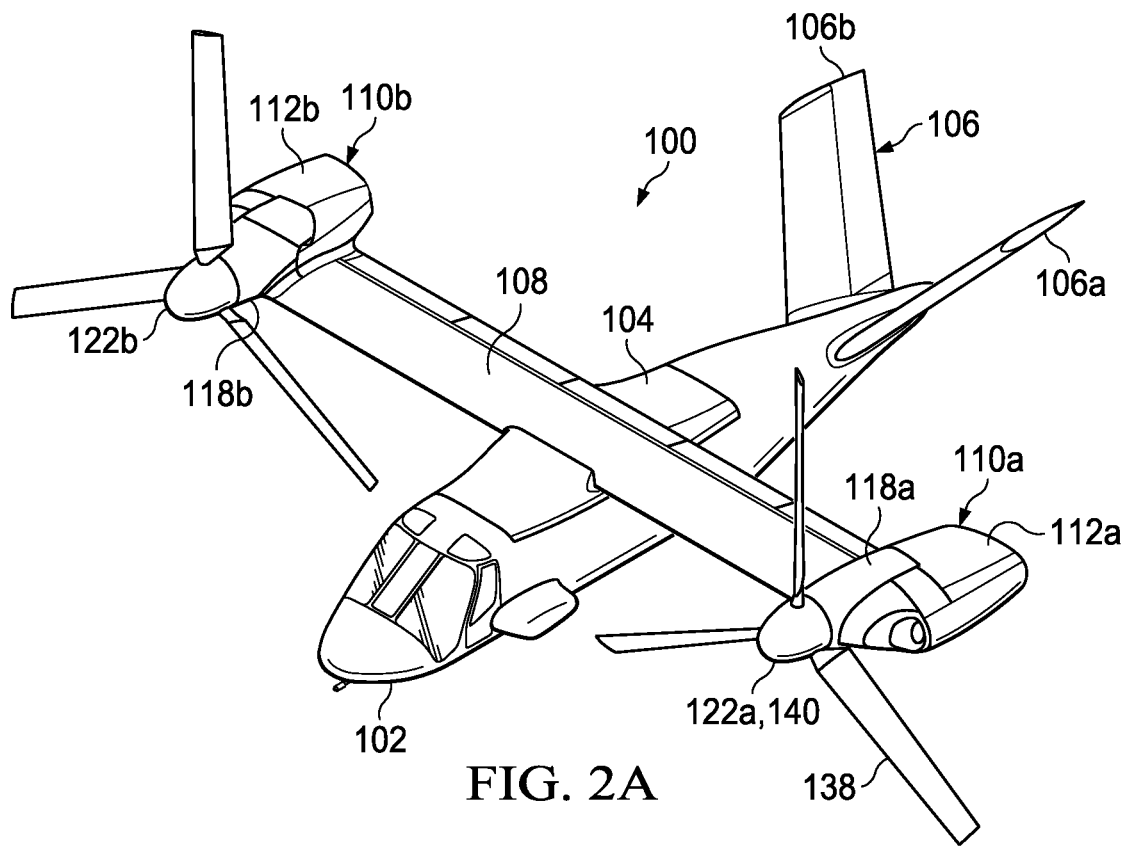
FIGS. 2A-2D are schematic illustrations of a tiltrotor aircraft having propulsion assemblies utilizing friction welded raceways in accordance with embodiments of the present disclosure.
Figure 2B:
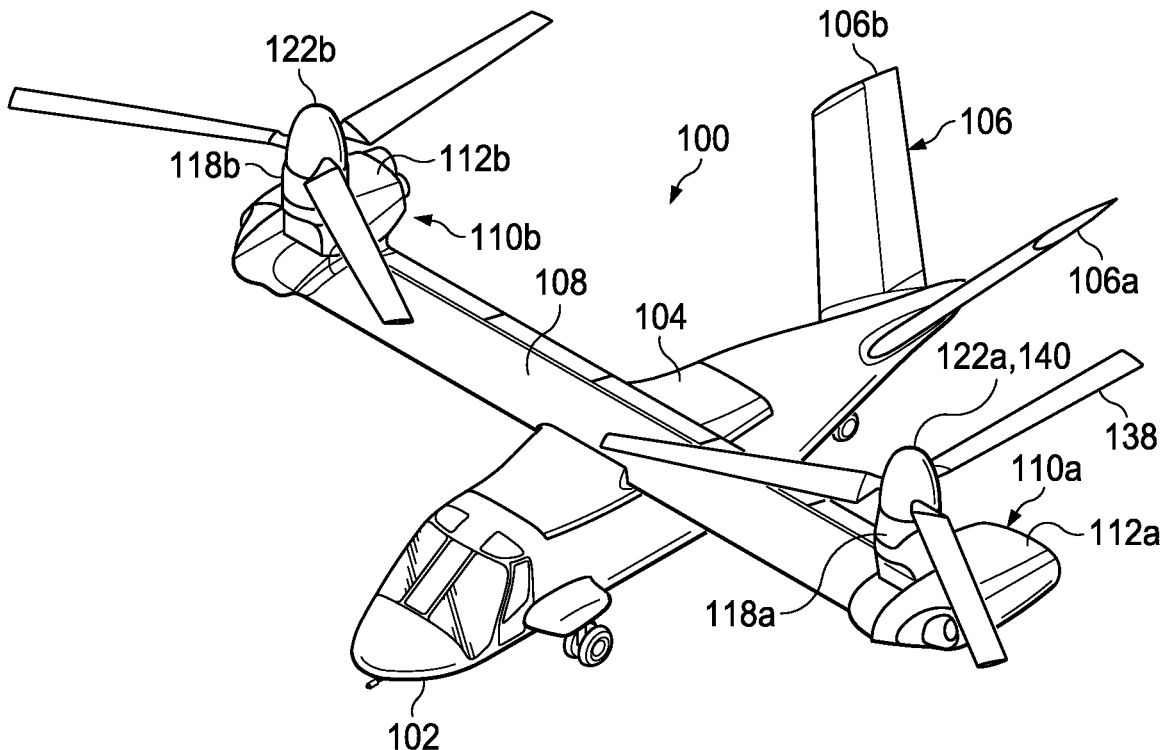
Figure 2C:
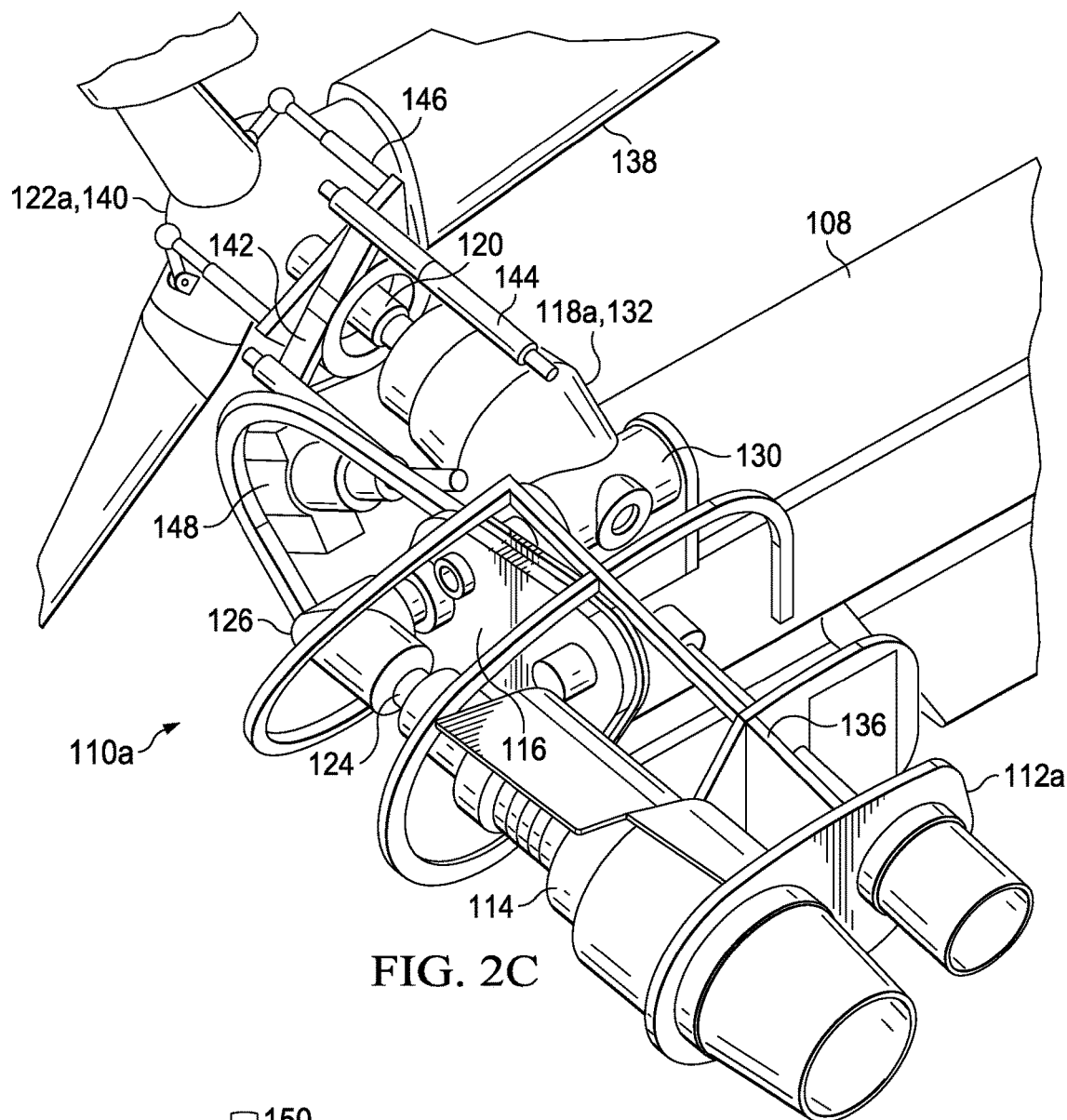
Figure 2D:
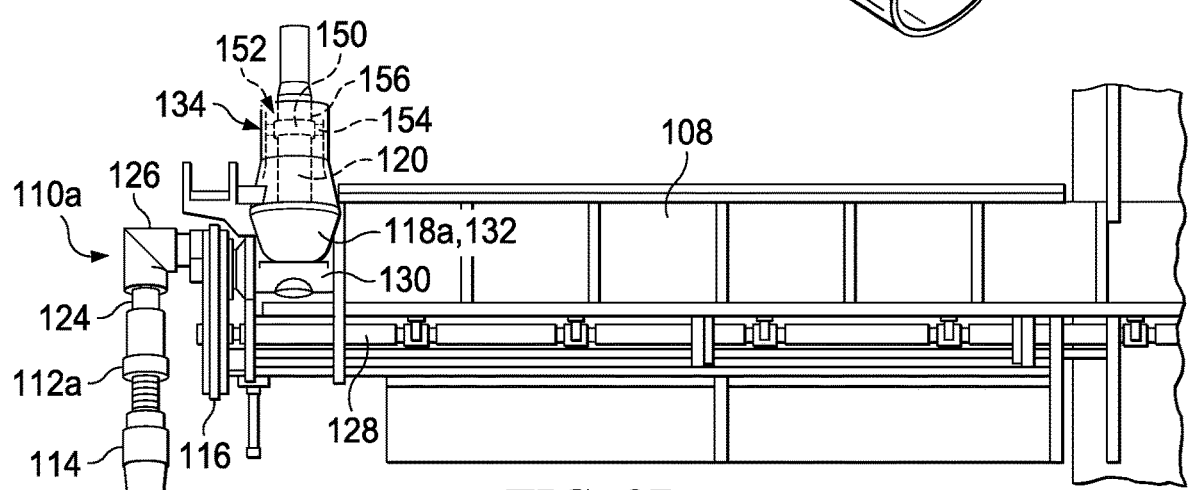

Referring to FIGS. 2A-2D in the drawings, a tiltrotor aircraft is schematically illustrated and generally designated 100. Tiltrotor aircraft 100 includes a fuselage 102, a wing mount assembly 104 and a tail assembly 106 including rotatably mounted tail members 106a, 106b having control surfaces operable for horizontal and/or vertical stabilization during forward flight. A wing member 108 is supported by wing mount assembly 104. Coupled to outboard ends of wing member 108 are propulsion assemblies 110a, 110b. Propulsion assembly 110a includes a nacelle depicted as fixed pylon 112a that houses an engine 114 and a transmission 116. Thus, the nacelle is fixed relative to wing member 108. In addition, propulsion assembly 110a includes a mast assembly 118a including a mast 120 that is rotatable relative to fixed pylon 112a, wing member 108 and fuselage 102 between a generally horizontal orientation, as best seen in FIGS. 2A, 2C and 2D, and a generally vertical orientation, as best seen in FIG. 2B. Propulsion assembly 110a also includes a proprotor assembly 122a, including proprotor blade assemblies radiating therefrom, which is rotatable responsive to torque and rotational energy provided via a rotor hub assembly and drive system mechanically coupled to engine 114 and transmission 116. Similarly, propulsion assembly 110b includes a nacelle depicted as fixed pylon 112b that houses an engine and transmission and a mast assembly 118b that is rotatable relative to fixed pylon 112b, wing member 108 and fuselage 102. Propulsion assembly 110b also includes a proprotor assembly 122b, including proprotor blade assemblies radiating therefrom, which is rotatable responsive to torque and rotational energy provided via a rotor hub assembly and drive system mechanically coupled to the engine and transmission housed by fixed pylon 112b.

FIG. 2A illustrates tiltrotor aircraft 100 in airplane or forward flight mode, in which proprotor assemblies 122a, 122b are rotating in a substantially vertical plane to provide a forward thrust enabling wing member 108 to provide a lifting force responsive to forward airspeed, such that tiltrotor aircraft 100 flies much like a conventional propeller driven aircraft. FIG. 2B illustrates tiltrotor aircraft 100 in helicopter or vertical takeoff and landing (VTOL) flight mode, in which proprotor assemblies 122a, 122b are rotating in a substantially horizontal plane to provide a lifting thrust, such that tiltrotor aircraft 100 flies much like a conventional helicopter. It should be appreciated that tiltrotor aircraft 100 can be operated such that proprotor assemblies 122a, 122b are selectively positioned between forward flight mode and VTOL flight mode, which can be referred to as a conversion flight mode. Even though tiltrotor aircraft 100 has been described as having one engine in each fixed pylon 112a, 112b, it should be understood by those having ordinary skill in the art that other engine arrangements are possible and are considered to be within the scope of the present disclosure including, for example, having a single engine which may be housed within fuselage 102 that provides torque and rotational energy to both proprotor assemblies 122a, 122b.

Referring now to FIGS. 2C and 2D, propulsion assembly 110a is disclosed in further detail. Propulsion assembly 110a is substantially similar to propulsion assembly 110b therefore, for sake of efficiency, certain features will be disclosed only with regard to propulsion assembly 110a. One having ordinary skill in the art, however, will fully appreciate an understanding of propulsion assembly 110b based upon the disclosure herein of propulsion assembly 110a. Engine 114 of propulsion assembly 110a is substantially fixed relative to wing 108. An engine output shaft 124 transfers power from engine 114 to a spiral bevel gearbox 126 that includes spiral bevel gears to change torque direction by 90 degrees from engine 114 to fixed transmission, or gearbox, 116 via a clutch. Fixed gearbox 116 includes a plurality of gears, such as helical gears, in a gear train that are coupled to an interconnect drive shaft 128 and a quill shaft (not visible) that supplies torque to an input in spindle gearbox 130 of proprotor gearbox 132, a portion of which may include mast bearing assembly 134. Interconnect drive shaft 128 provides a torque path that enables a single engine of tiltrotor aircraft 100 to provide torque to both proprotor assemblies 122a, 122b in the event of a failure of the other engine. In the illustrated embodiment, interconnect drive shaft 128 includes a plurality of segments that share a common rotational axis.

Engine 114 is housed and supported in fixed pylon 112a, which may include features such as an inlet, aerodynamic fairings and exhaust, as well as other structures and systems to support and facilitate the operation of engine 114. The airframe of tiltrotor aircraft 100, which supports the various sections of tiltrotor aircraft 100 including fuselage 102, includes a propulsion assembly airframe section 136 that supports propulsion assembly 110a. Proprotor assembly 122a of propulsion assembly 110a includes three proprotor blade assemblies 138 that are coupled to a rotor hub 140. Rotor hub 140 is coupled to mast 120, which is coupled to proprotor gearbox 132. Together, spindle gearbox 130, proprotor gearbox 132 and mast 120 are part of mast assembly 118a that rotates relative to fixed pylon 112a. In addition, it should be appreciated by those having ordinary skill in the art that mast assembly 118a may include different or additional components, such as a pitch control assembly depicted as swashplate 142, actuators 144 and pitch links 146, wherein swashplate 142 is selectively actuated by actuators 144 to selectively control the collective pitch and the cyclic pitch of proprotor blade assemblies 138 via pitch links 146. A linear actuator, depicted as conversion actuator 148 of fixed pylon 112a, is operable to reversibly rotate mast assembly 118a relative to fixed pylon 112a, which in turn selectively positions proprotor assembly 122a between forward flight mode, in which proprotor assembly 122a is rotating in a substantially vertical plane, and VTOL flight mode, in which proprotor assembly 122a is rotating in a substantially horizontal plane.

Propulsion assembly 110a includes an annular raceway 150, which surrounds mast 120 at a raceway receiving station 152 of mast 120. Roller bearings 154 of mast bearing assembly 134, which may carry reactions in the shear direction, circumferentially face mast 120 to engage raceway 150. In some embodiments, raceway 150 is formed from a different material, such as a different type of steel, than mast 120 so that raceway 150 can be hardened using any hardening technique while mast 120 may be formed from a material that is not as easily hardened but exhibits suitable corrosion resistance properties. Raceway 150 provides a smooth and hard surface on which roller bearings 154 may roll. Raceway 150 is friction welded to mast 120 at raceway receiving station 152, thereby forming an integral mast-raceway structure 156 in which raceway 150 is fused to mast 120. The friction weld between raceway 150 and mast 120 prevents raceway 150 from rotating around mast 120 or moving axially along mast 120. Raceway 150 is similar to raceway 40 of helicopter 10 except that it is adapted to tiltrotor aircraft 100, demonstrating the versatility and applicability of the raceway to a wide range of aviation environments.

It should be appreciated that helicopter 10 and tiltrotor aircraft 100 are merely illustrative of a variety of aircraft that can implement the embodiments disclosed herein. Indeed, propulsion assemblies utilizing friction welded raceways 40, 150 may be implemented on any rotorcraft. Other aircraft implementations can include hybrid aircraft, tiltwing aircraft, quad tiltrotor aircraft, unmanned aircraft, gyrocopters, propeller-driven airplanes, compound helicopters, drones and the like. As such, those skilled in the art will recognize that propulsion assemblies utilizing friction welded raceways 40, 150 can be integrated into a variety of aircraft configurations. It should be appreciated that even though aircraft are particularly well-suited to implement the embodiments of the present disclosure, non-aircraft vehicles and devices can also implement the embodiments.

Figure 3B:
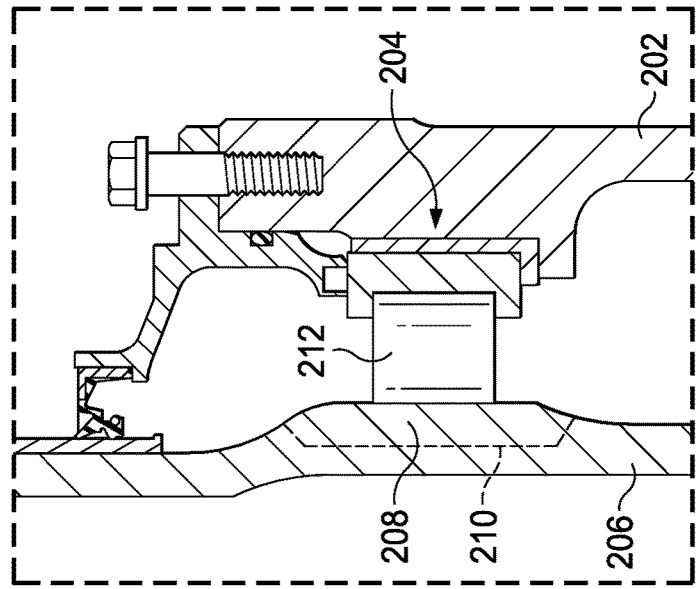
Figure 3A:
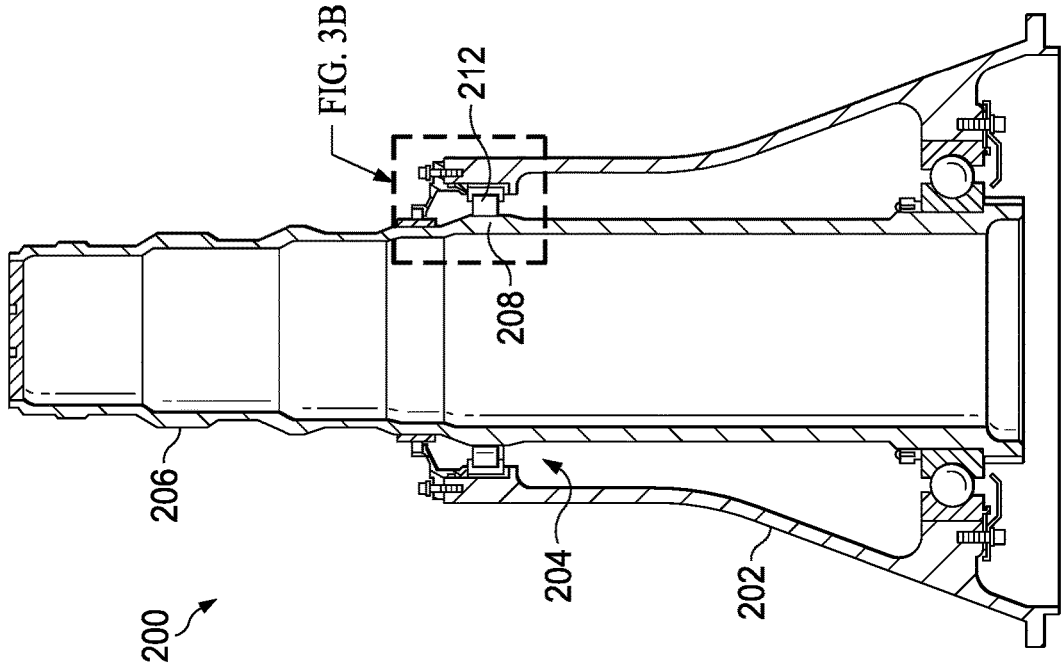

Referring to FIGS. 3A-3F in the drawings, various raceway configurations for propulsion assemblies are schematically illustrated. In FIGS. 3A and 3B, propulsion assembly 200 includes top case 202 in which mast bearing assembly 204 supports the stable rotation of mast 206. Propulsion assembly 200 utilizes an integral raceway configuration in which raceway 208 is integral with and formed from the same material as mast 206. Portion 210 of mast 206 that forms raceway 208 is heat treated to provide a hard and durable surface on which roller bearings 212 may roll. For example, portion 210 of mast 206 that forms raceway 208 may be heat treated to a depth in a range between 25 and 150 thousandths of an inch, or more particularly in a range between 50 and 100 thousandths of an inch. Because the mast itself is heat treated to form raceway 208, the material from which mast 206 may be formed is restricted to steel that can be induction hardened such as 4340 alloy steel or steel that can be carburized such as X53 alloy steel. Steel types that can be case hardened or locally hardened to form sufficiently effective raceways, however, tend to have poor corrosion resistance, and may, for example, have a tendency to corrode at the hub spline and require replacement at high intervals depending on the working environment. While corrosion issues can be mitigated by using stainless steel (CRES) for mast 206, the integral raceway configuration of propulsion assembly 200 requires a case hardened surface which cannot be sufficiently achieved with stainless steel material.

In FIGS. 3C and 3D, propulsion assembly 216 includes top case 218, in which mast bearing assembly 220 supports the stable rotation of mast 222. Raceway 224 utilized by propulsion assembly 216 is not integral with mast 222. Raceway 224 is retained or coupled onto mast 222 using a threaded lock ring 226, nuts and other fasteners. Because raceway 224 is not integral with mast 222, raceway 224 may be hardened independently of mast 222. Raceway 224 may also be formed from a material that can be sufficiently hardened to act as a raceway for roller bearings 228, while mast 222 may be formed from a corrosion resistant material that is not as easily hardened such as stainless steel. The fasteners, such as lock ring 226, used to retain raceway 224 on mast 222, however, present other drawbacks for propulsion assembly 216. For example, the local roller bearing and contact stress loads around raceway 224 and bending stresses of mast 222 require a tight fit between mast 222 and raceway 224. Fasteners 226 leave undesirable spaces, such as space 230, between mast 222 and raceway 224, which may cause undesirable and structurally compromising motions in response to these contact and bending stress loads. Threads 232 also require intricate machining that cause local stress concentrations in response to mast bending, thereby generating structural fatigue. The stress concentrations occurring at threads 232 are in an undesirable location due to induced cyclic loading during flight. Fastening raceway 224 onto mast 222 using fasteners such as lock ring 226 also requires additional parts, which add more weight to the rotorcraft.

Figure 3F:
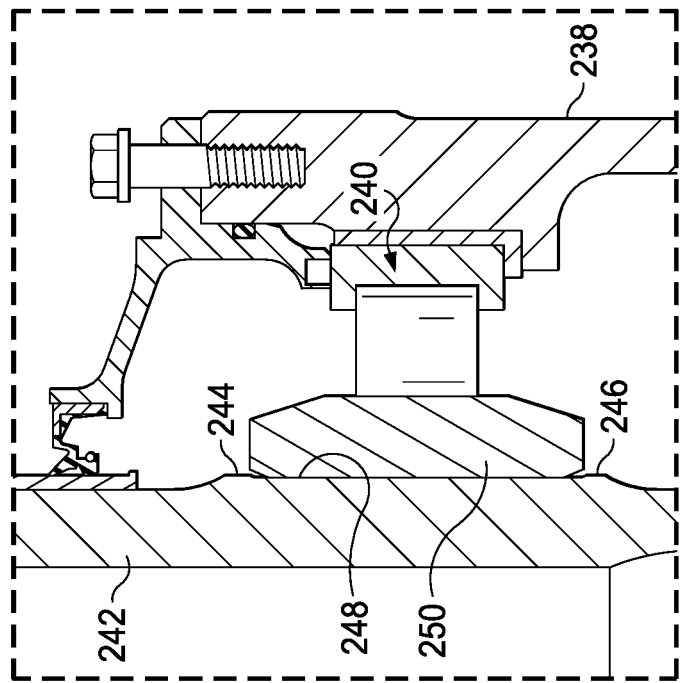
Figure 3E:
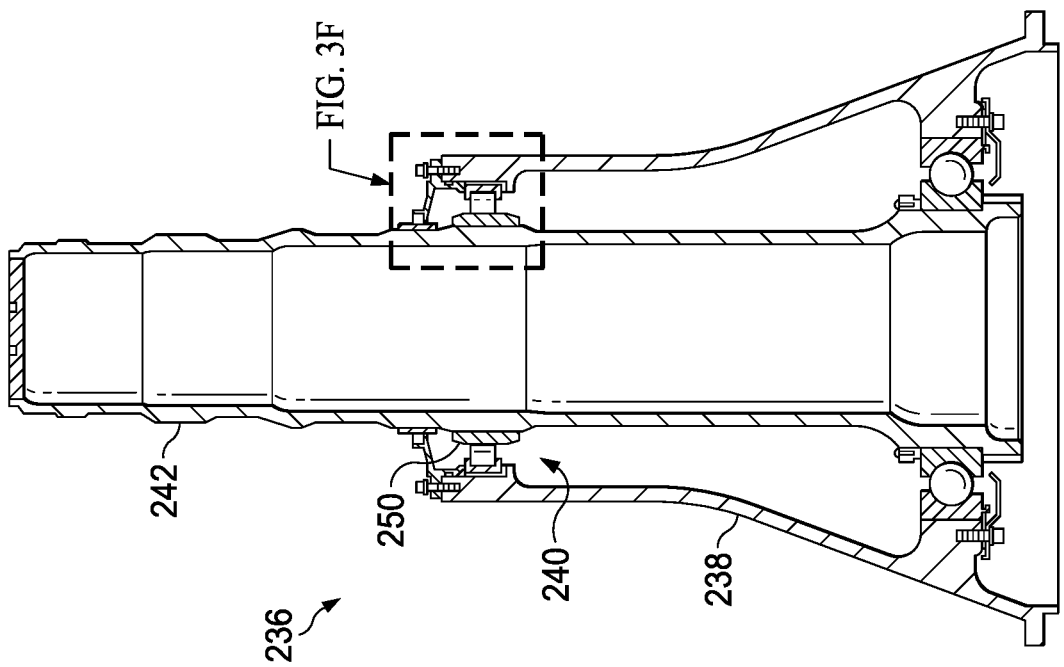

In FIGS. 3E-3F, propulsion assembly 236 includes top case 238, which houses mast bearing assembly 240 to support the stable rotation of mast 242. Mast 242 includes distal ridge 244 and proximal ridge 246, which extend circumferentially around mast 242 and form retaining pocket 248 therebetween. Nonintegral raceway 250 is received and retained at retaining pocket 248, forming a press fit between raceway 250 and mast 242 to retain raceway 250. In addition to the press fit between raceway 250 and mast 242, distal and proximal ridges 244, 246 help to reduce translation or axial motion of raceway 250 along mast 242 due to loads or deflections during operation, thereby securing raceway 250 within retaining pocket 248. While propulsion assembly 236 does not use fasteners to retain raceway 250 on mast 242, propulsion assembly 236 may require a thickened mast wall to structurally maintain a press fit between raceway 250 and mast 242. Relying on a press fit may also cause raceway 250 to be more susceptible to axial slippage along mast 242 as well as circumferential slippage about mast 242. Prior attempts have also been made to weld a bottom mast portion formed from a steel that can be induction hardened to a top mast portion formed from a corrosion resistant steel, thereby allowing an integral raceway to be formed on the bottom mast portion. Such prior attempts, however, require a weld line in the circumferential or radial direction of the mast, which is an undesirable condition causing the torque path to travel entirely through the welded joint between the two mast portions.

Referring to FIGS. 4A-4C in the drawings, propulsion assembly 300 utilizing annular raceway 302 of the illustrative embodiments is schematically illustrated. Propulsion assembly 300 includes top case 304, which houses mast bearing assembly 306 to support the stable rotation of mast 308. Mast bearing assembly 306 includes roller bearings 310, which face mast 308 to engage raceway 302. Raceway 302 has a tapered inner surface 312. Mast 308 has a tapered outer surface 314 at raceway receiving station 316 that complements the shape of tapered inner surface 312. Tapered inner surface 312 of raceway 302 is friction welded to tapered outer surface 314 of mast 308 at raceway receiving station 316 to form a tapered friction weld line or surface 318. After raceway 302 is friction welded to mast 308, raceway 302 is integral with mast 308 to form an integral mast-raceway structure 320.

In the illustrated embodiment, raceway 302 has been machined to form a shape adapted to engage roller bearings 310. Machining raceway 302 also reduces the weight of raceway 302 by removing nonutilized material. Raceway 302 may be machined before or after being friction welded to mast 308 depending on the embodiment. Raceway 302 and mast 308 form a lead-in chamfer 322 to facilitate installation of mast 308 into mast bearing assembly 306. Lead-in chamfer 322 is adjacent to the top edge of raceway 302, although in other embodiments lead-in chamfer 322 or an additional lead-in chamfer may be positioned adjacent to the bottom edge of raceway 302. Either or both of raceway 302 and mast 308 may be machined to form lead-in chamfer 322. Lead-in chamfer 322 may form any chamfer angle 324 with a longitudinal axis 326 of mast 308 or a reference line 328 parallel to longitudinal axis 326. For example, chamfer angle 324 may be in a range between 5 degrees and 60 degrees such as 15 degrees or 45 degrees. In other embodiments, lead-in chamfer 322 may be filleted instead of forming a chamfer.

Tapered friction weld line 318 forms a taper angle 330 with longitudinal axis 326 of mast 308 or a reference line 332 parallel to longitudinal axis 326. Taper angle 330 may vary based on a wide variety of parameters such as the diameters, sizes, material compositions, wall thicknesses and/or anticipated loads of either or both of raceway 302 and mast 308. Taper angle 330 may also be selected to induce a normal load that allows tapered inner surface 312 of raceway 302 and tapered outer surface 314 of mast 308 to heat up and adhere to one another during the friction welding process. In some embodiments, taper angle 330 may be an acute taper angle in a range between 10 degrees and 60 degrees such as an acute angle in a range between 25 degrees and 45 degrees.

Because raceway 302 does not become integral with mast 308 until being friction welded thereto, raceway 302 may be formed from a different material than mast 308. In particular, raceway 302 may be formed from a high strength, high hardness steel capable of being hardened or through-hardened such as a material used to form roller bearings in high stress aviation applications. For example, raceway 302 may be formed from an M50 alloy steel bearing material and/or a high-speed premium melted alloy with a high level of molybdenum. In the illustrated embodiment, raceway 302 is a through-hardened raceway that provides a smooth, hard and durable surface against which roller bearings 310 may engage. In one non-limiting example, raceway 302 may be hardened in a range between 50 and 70 on the Rockwell hardness scale. Raceway 302 may be formed from a material such as 4340 alloy steel or X53 alloy steel that is capable of being hardened independently of mast 308. Raceway 302 may also be formed from carburized steel and/or a material that undergoes a heat treatment process in which iron or steel absorbs carbon while the metal is heated in the presence of a carbon-bearing material such as charcoal or carbon monoxide. Raceway 302 is less susceptible to corrosion-causing moisture by being housed within top case 304. Mast 308, however, is not restricted to being formed from materials capable of being hardened to a level necessary for raceway 302. Mast 308 may instead be formed from a material that is corrosion resistant such as 13-8, 17-4 or corrosion resistant steel (CRES). Corrosion resistant steels protect mast 308 from corrosion caused, for example, by weather or power washing maintenance. In one non-limiting example, mast 308 may have a hardness in a range between 30 and 45 on the Rockwell hardness scale. In the illustrated embodiment, mast 308 is formed from a nonhardened material that has corrosion resistance properties. The absolute and relative dimensions of raceway 302 and mast 308 may vary widely depending on the aircraft or application in which raceway 302 and mast 308 are implemented. In some embodiments, the wall thickness of either or both of raceway 302 and mast 308 may be thickened at tapered friction weld line 318 to provide structural reinforcement.

In the illustrative embodiments, raceway 302 formed from hardened metal is friction welded to mast 308 formed from corrosion resistant metal and is machined or ground to suitable dimensions for placement within propulsion assembly 300. Thus, using the illustrative embodiments, a raceway of sufficiently through-hardened material can be mounted to a stainless steel mast having corrosion resistance properties without the use of superfluous fasteners or other parts, thereby reducing the weight and complexity of propulsion assembly 300. Unlike propulsion assembly 216 in FIGS. 3C and 3D, the friction weld between raceway 302 and mast 308 does not require threads or threaded fasteners that create stress concentrations at or around raceway 302 during operation. In contrast to the integral raceway of FIGS. 3A and 3B in which only a shallow surface portion of the mast is case hardened, the illustrative embodiments allow for a thicker raceway to withstand the loads and stresses exerted onto mast 308 by the rotor hub and reacted by roller bearings 310. Unlike press fit raceway 250 in FIGS. 3E and 3F, friction welded raceway 302 is not susceptible to axial slippage along mast 308 or circumferential slippage about mast 308 and may also be compatible with thinner mast wall configurations. The use of friction welded raceway 302 also does not require the use of a circumferential or radial weld line in mast 308 that could compromise the structural integrity of mast 308 when subjected to torque loads and provides a large welded surface area to strengthen the integral bond between raceway 302 and mast 308.

Mast bearing assembly 306 also includes a thrust bearing assembly 334 that may carry shear and thrust loads of propulsion assembly 300. In some embodiments, thrust bearing assembly 334 may include a friction welded raceway with an outer concavity to contour the ball bearings therein. In other embodiments, the ball bearings of thrust bearing assembly 334 may be replaced with roller bearings and may engage with a friction welded raceway similar to raceway 302. In yet other embodiments, roller bearings 310 may instead be ball bearings and the outer surface of raceway 302 may form a concave surface to contour the ball bearings.

Figure 5C:
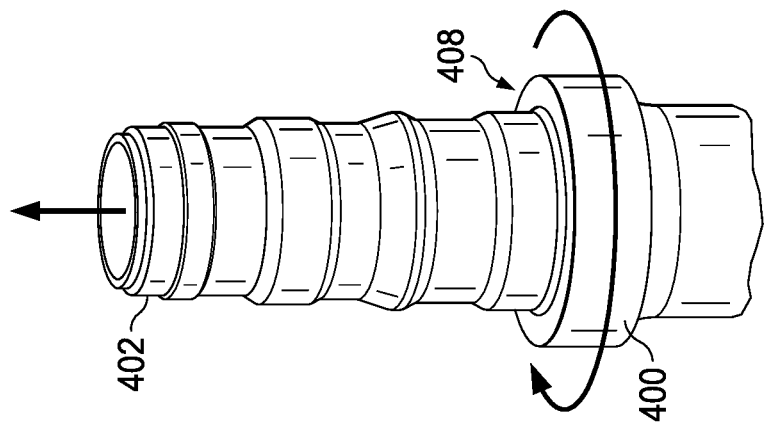
FIGS. 5A-5F are various views of different stages of assembling an integral mast-raceway structure for a rotorcraft in accordance with embodiments of the present disclosure.
Figure 5B:
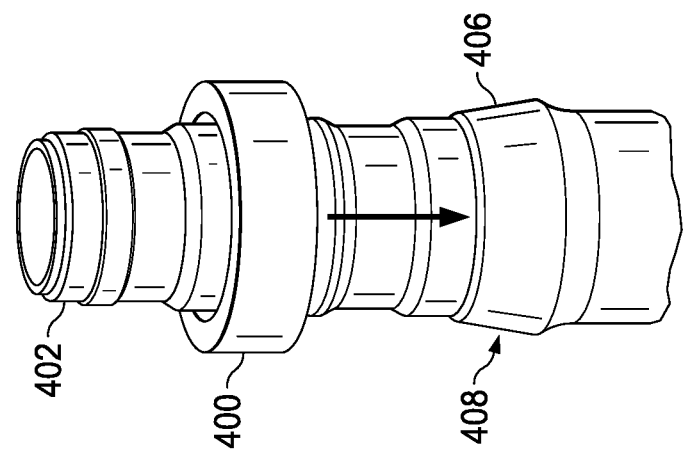
Figure 5A:
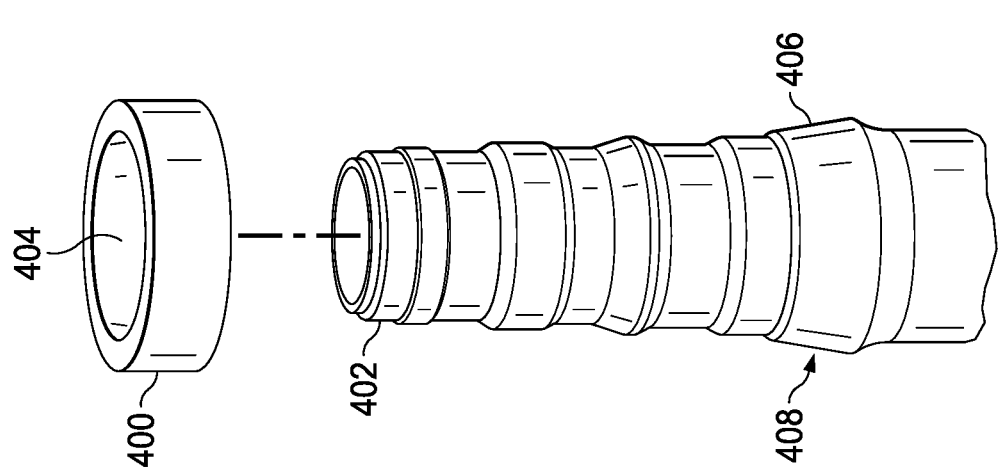
Figure 5D:
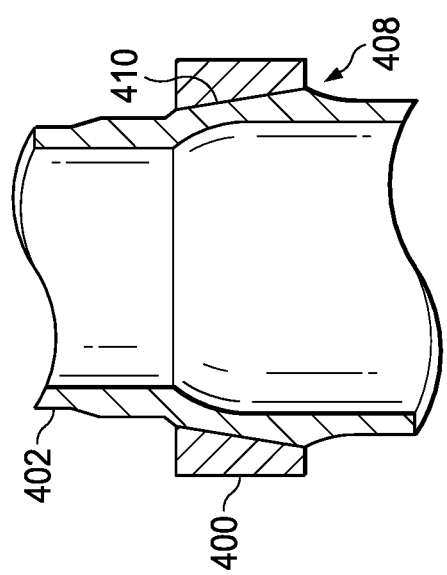
Figure 5E:
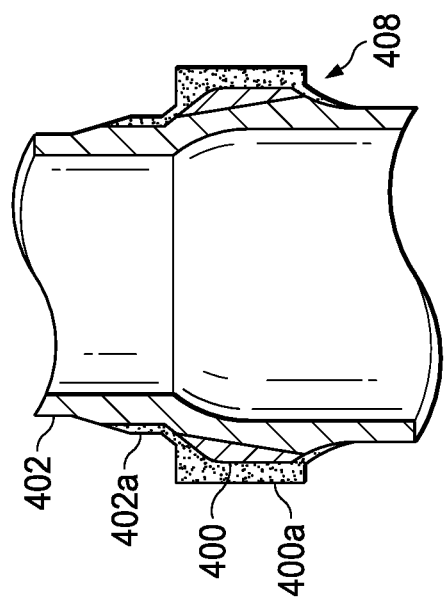
Figure 5F:
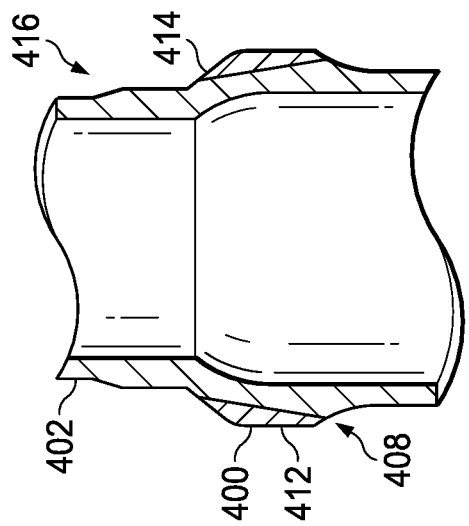

Referring to FIGS. 5A-5F in the drawings, a method for assembling an integral mast-raceway structure for a rotorcraft is schematically illustrated. In FIG. 5A, raceway 400 and mast 402 are provided. Raceway 400 includes tapered inner surface 404 and mast 402 includes tapered outer surface 406 at raceway receiving station 408. Raceway 400 may be induction hardened, carburized or otherwise hardened using any material hardening technique. As shown in FIG. 5B, raceway 400 is slid onto mast 402 or mast 402 is slid into raceway 400 until raceway 400 is positioned proximate raceway receiving station 408 as shown in FIG. 5C. In FIG. 5C, raceway 400 is rotated or spun about the longitudinal axis of mast 402 such as by attaching raceway 400 to a flywheel while the nonrotating mast 402 is driven or pressed into raceway 400 along the longitudinal axis of mast 402 to friction weld raceway 400 to mast 402. In other embodiments, mast 402 may be rotated while raceway 400 does not rotate. In yet other embodiments, raceway 400 and mast 402 may be rotated in opposite directions. In addition, either raceway 400 or mast 402 may be pressed into the other of raceway 400 or mast 402 to effectuate the friction weld therebetween while either or both elements are rotating. In other embodiments, both raceway 400 and mast 402 are pressed against one another to effectuate the friction weld therebetween. FIG. 5D shows raceway 400 friction welded to, and thereby integrally fused with, mast 402 along tapered friction weld line 410. In FIG. 5E, portions 400a, 402a of raceway 400 and mast 402 have been machined or otherwise removed. More particularly, raceway 400 has been machined to form a bearing engagement surface 412 for one or more bearings. The machining step may also include cleaning or removing any material that has been extruded from the weld line between raceway 400 and mast 402 during the friction welding process. Either or both of raceway 400 and mast 402 may also be machined to form lead-in chamfer 414 shown in FIG. 5F. FIG. 5F shows raceway 400 and mast 402 as an integral mast-raceway structure 416 after the friction welding and machining processes.

Figure 6:
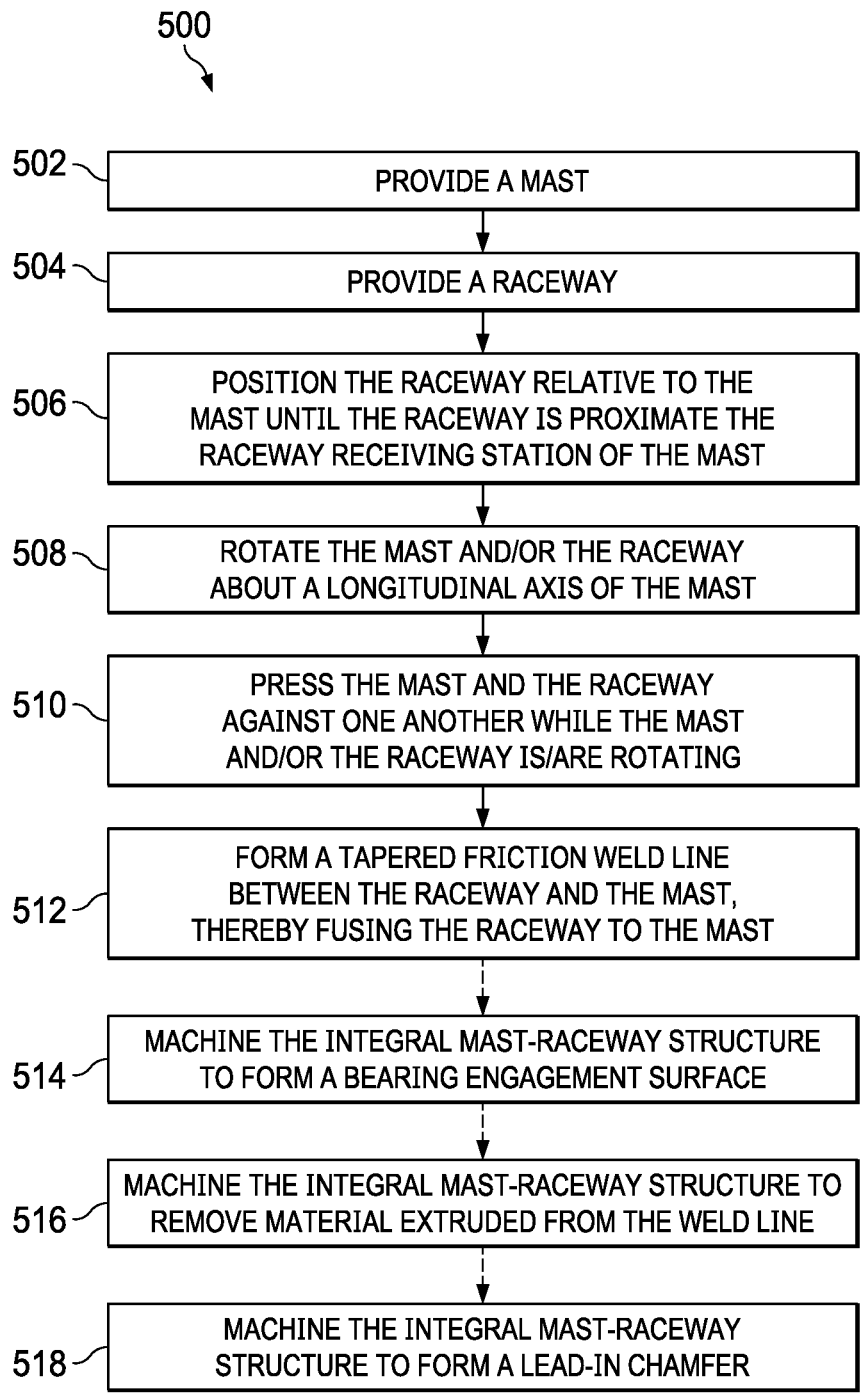
FIG. 6 is a flowchart of a method for assembling an integral mast-raceway structure for a rotorcraft in accordance with embodiments of the present disclosure.

Referring to FIG. 6 in the drawings, a method for assembling an integral mast-raceway structure for a rotorcraft is schematically illustrated and generally designated 500. The method includes providing a mast (step 502) and providing a raceway (step 504). The method includes positioning the raceway relative to the mast until the raceway is proximate the raceway receiving station of the mast (step 506). The method also includes rotating the mast and/or the raceway about a longitudinal axis of the mast (step 508) and pressing the mast and the raceway against one another while the mast and/or the raceway is/are rotating (step 510). The method may conclude by forming a tapered friction weld line between the raceway to the mast, thereby fusing the raceway to the mast (step 512). In some embodiments, the integral mast-raceway structure may additionally be machined for a variety of purposes such as forming a bearing engagement surface (optional step 514), removing material extruded from the weld line (optional step 516) and/or forming a lead-in chamfer (optional step 518).

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion assembly for a rotorcraft comprising:
a raceway having a tapered inner surface;
a mast configured to receive the raceway at a raceway receiving station located intermediate between first and second ends of the mast, the mast having a tapered outer surface at the raceway receiving station; and
a mast bearing assembly including a plurality of bearings facing the mast to engage the raceway;
wherein, the tapered inner surface of the raceway is friction welded to the tapered outer surface of the mast at the raceway receiving station to form a tapered friction weld line.

2. The propulsion assembly as recited in claim 1 wherein the raceway further comprises an M50 alloy steel.

3. The propulsion assembly as recited in claim 1 wherein the raceway further comprises 4340 alloy steel.

4. The propulsion assembly as recited in claim 1 wherein the raceway further comprises carburized steel.

5. The propulsion assembly as recited in claim 1 wherein the raceway is formed from a different material than the mast.

6. The propulsion assembly as recited in claim 1 wherein the raceway comprises a machined raceway shaped to engage the plurality of bearings.

7. The propulsion assembly as recited in claim 1 wherein the mast comprises a corrosion resistant steel (CRES).

8. The propulsion assembly as recited in claim 1 wherein at least one of the raceway or the mast forms a lead-in chamfer adjacent to an edge of the raceway.

9. The propulsion assembly as recited in claim 1 wherein the raceway is friction welded to the mast to form an integral mast-raceway structure.

10. The propulsion assembly as recited in claim 1 wherein the tapered friction weld line forms an acute taper angle.

11. The propulsion assembly as recited in claim 10 wherein the acute taper angle is in a range between 25 degrees and 45 degrees.

12. A rotorcraft comprising:
a fuselage; and
a propulsion assembly coupled to the fuselage, the propulsion assembly comprising:
a raceway having a tapered inner surface;
a mast configured to receive the raceway at a raceway receiving station located intermediate between first and second ends of the mast, the mast having a tapered outer surface at the raceway receiving station; and
a mast bearing assembly including a plurality of bearings facing the mast to engage the raceway;
wherein, the tapered inner surface of the raceway is friction welded to the tapered outer surface of the mast at the raceway receiving station to form a tapered friction weld line.

13. The rotorcraft as recited in claim 12 wherein the propulsion assembly further comprises a top case housing the mast bearing assembly.

14. The rotorcraft as recited in claim 12 wherein the rotorcraft comprises a helicopter and the propulsion assembly further comprises a main rotor assembly.

15. The rotorcraft as recited in claim 12 wherein the rotorcraft comprises a tiltrotor aircraft, further comprising:
a wing supported by the fuselage and including first and second outboard ends;
wherein, the propulsion assembly further comprises first and second propulsion assemblies each coupled to a respective outboard end of the wing, the mast of each propulsion assembly rotatable relative to the fuselage between a plurality of positions including a substantially horizontal orientation in a forward flight mode and a substantially vertical orientation in a vertical takeoff and landing flight mode.

16. A method for assembling an integral mast-raceway structure for a rotorcraft, the method comprising:
providing a mast having a raceway receiving station with a tapered outer surface, the raceway receiving station located intermediate between first and second ends of the mast;
providing a raceway having a tapered inner surface;
positioning the raceway relative to the mast until the raceway is proximate the raceway receiving station of the mast;
rotating at least one of the mast or the raceway about a longitudinal axis of the mast;
pressing the mast and the raceway against one another while the at least one of the mast or the raceway is rotating; and
forming a tapered friction weld line between the raceway and the mast, thereby fusing the raceway to the mast.

17. The method as recited in claim 16 wherein rotating the at least one of the mast or the raceway comprises rotating the raceway about the longitudinal axis of the mast; and
wherein, pressing the mast and the raceway against one another comprises pressing the mast against the rotating raceway.

18. The method as recited in claim 16 further comprising machining the raceway to form a bearing engagement surface.

19. The method as recited in claim 16 further comprising machining at least one of the mast or the raceway to remove material extruded from the weld line.

20. The method as recited in claim 16 further comprising machining at least one of the mast or the raceway to form a lead-in chamfer.

* * * * *